United States Patent [19]
Entmayr et al.

[11] Patent Number: 4,971,643
[45] Date of Patent: Nov. 20, 1990

[54] METHOD FOR RETREADING AND PARTIALLY REPLACING THE BELT OF A PNEUMATIC VEHICLE TIRE HAVING A RADIAL CARCASS TIRE BODY

[75] Inventors: Peter Entmayr, Burgwedel; Manfred Reppin, Hanover; Werner Küster, Sarstedt, all of Fed. Rep. of Germany

[73] Assignee: Continental Aktiengesellschaft, Hanover, Fed. Rep. of Germany

[21] Appl. No.: 401,467

[22] Filed: Aug. 29, 1989

Related U.S. Application Data

[63] Continuation-in-part of Ser. No. 202,188, Jun. 2, 1988, abandoned.

[30] Foreign Application Priority Data

Jun. 4, 1987 [DE] Fed. Rep. of Germany ....... 3718703

[51] Int. Cl.⁵ ............................................ B29D 30/56
[52] U.S. Cl. .................... 156/96; 156/128.6; 264/36
[58] Field of Search ................... 156/96, 95, 124, 909, 156/128.6; 264/36, 326, DIG. 74

[56] References Cited

U.S. PATENT DOCUMENTS

| | | | |
|---|---|---|---|
| 844,820 | 2/1907 | Marks | 156/128.6 |
| 1,306,602 | 6/1919 | McEwen | 156/96 |
| 1,426,672 | 8/1922 | Radford | 156/96 |
| 1,488,343 | 3/1924 | Hoffman | 156/130.7 |
| 1,519,545 | 12/1924 | Marquette | 156/128.6 |
| 2,405,943 | 8/1946 | Doering et al. | 156/96 |
| 3,841,376 | 10/1974 | Paulin et al. | 156/96 X |

FOREIGN PATENT DOCUMENTS

| | | | |
|---|---|---|---|
| 0189826 | 8/1986 | European Pat. Off. | 264/36 |
| 57-100043 | 6/1982 | Japan | 156/96 |

*Primary Examiner*—Raymond Hoch
*Attorney, Agent, or Firm*—Robert W. Becker & Associates

[57] ABSTRACT

A method for retreading and partially replacing the belt of a pneumatic vehicle tire, possibly accompanied by the interposition of binder layers and the use of coatings. First the replacement belt ply or plies, and then the finish-vulcanized profiled tread strip, are placed upon the tire body. A pressure treatment, possibly at an elevated temperature, is then effected. In order, along with a relatively short vulcanizing or processing time in the vulcanizing apparatus, to be able to dispense with the use of steel bandages or sleeves, the replacement belt ply or plies are vulcanized prior to placing these plies on the tire body.

17 Claims, 1 Drawing Sheet

U.S. Patent
Nov. 20, 1990
4,971,643
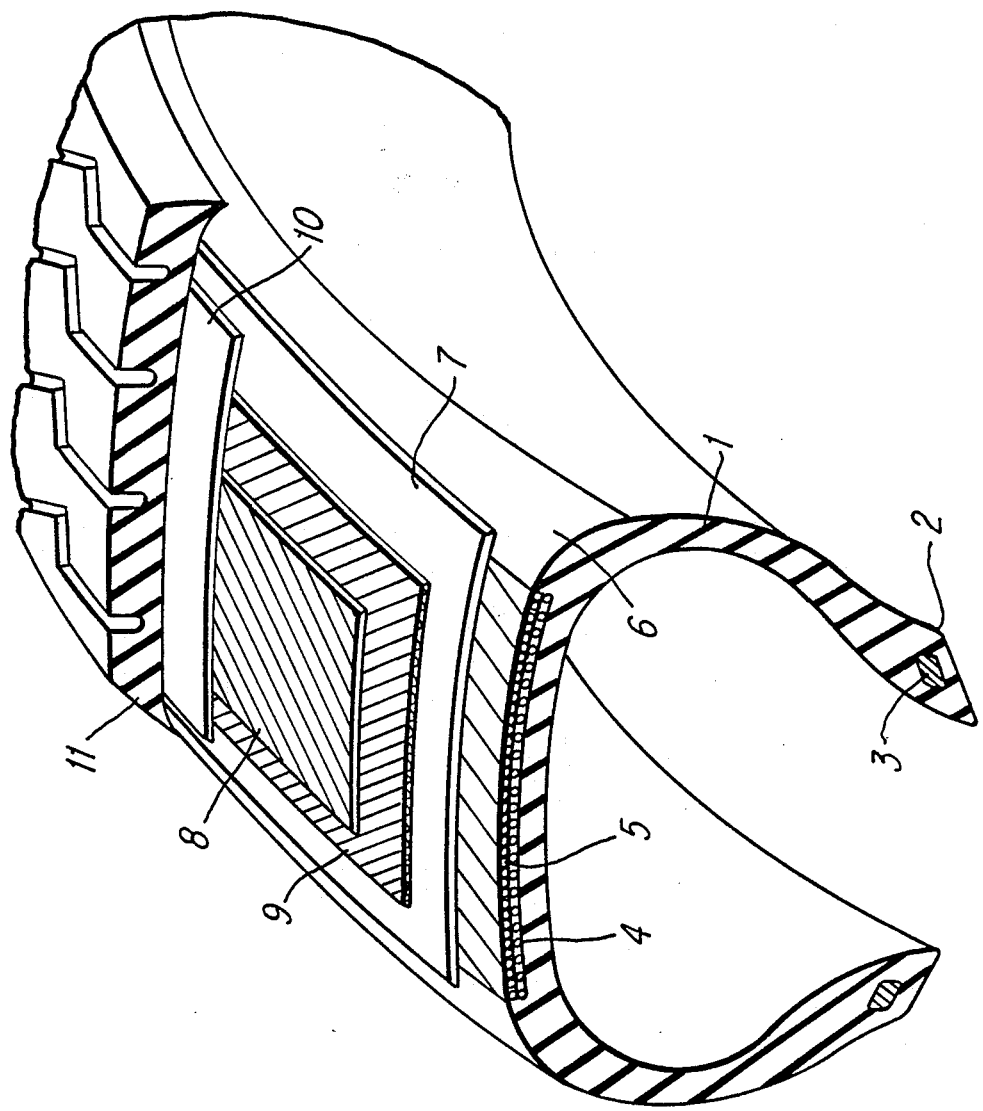

METHOD FOR RETREADING AND PARTIALLY REPLACING THE BELT OF A PNEUMATIC VEHICLE TIRE HAVING A RADIAL CARCASS TIRE BODY

This is a continuation-in-part application of copending parent application Ser. No. 202,188-Entmayr et al filed June 2, 1988 belonging to the assignee of the present invention and now abandoned.

BACKGROUND OF THE INVENTION

The present invention relates to a method for retreading and partially replacing the belt of a pneumatic vehicle tire having a radial carcass tire body, possibly accompanied by the interposition of binder layers and the use of coatings. First the replacement ply or plies, and then the finish-vulcanized, profiled tread strip, are placed upon the tire body, with the thus-built-up tire then being subjected to a pressure treatment, possibly at an elevated temperature.

In the event that a partial replacement of the belt is not required, the method that is often known as the cold topcapping method has the great advantage that for the purpose of a final processing in an autoclave or vulcanizing apparatus, the finish-overlaid tire body can be provided with a rubber sleeve that surrounds the tire body. As a result of the internal tire pressure and the pressure that exists in the vulcanizing apparatus, there then results at an elevated temperature a reliable bonding of the previously vulcanized and finish-profiled tread strip.

However, in the event that one or more belt plies also have to be replaced, the previously described simple method can no longer be used. Instead, the finish-overlaid tire must under these conditions be surrounded or enveloped by a steel bandage in order to preclude, for example, undesired shifting of the load-carrying cords of the belt, for example changes in the angular orientation of these cords.

It is therefore an object of the present invention to improve a method of the aforementioned general type in such a way that along with a relatively short vulcanizing or processing time in the vulcanizing apparatus, the aforementioned steel bandage or sleeve can be eliminated.

BRIEF DESCRIPTION OF THE DRAWING

This object, and other objects and advantages of the present invention, will appear more clearly from the following specification in conjunction with the accompanying schematic drawing, which, for the purpose of explaining the method of the present invention, illustrates the sheets or layers that are to be placed upon the tire body, which is topcapped in a cold state.

SUMMARY OF THE INVENTION

The method of the present invention is characterized primarily by the step of vulcanizing the replacement belt plies prior to placing them upon the tire body. At least a preliminary vulcanization must be completed, with the task of bringing about an adequate inherent stiffness of the enveloping rubber for the load-carrying cords of the belt.

Under these conditions, the final processing of the tire can be undertaken without the need for an additional steel bandage; it is sufficient to use a straightforward rubber sleeve.

An undesired shifting of the load-carrying cords of the newly applied belt plies is therefore precluded, because the load-carrying cords are prevented from undergoing undesired shifting of positions due to the presence of the already adequately cured or hardened enveloping material.

Further specific features of the present invention will be described in detail subsequently.

DESCRIPTION OF PREFERRED EMBODIMENTS

Referring now to the drawing in detail, the body of the tire, in a customary fashion, is comprised of rubber or rubber-like material. The tire body is strengthened by a plurality of reinforcing members.

The actual tire body 1 is strengthened by a radial carcass, which is not shown in any detail, and which is anchored in the bead region 2 by being looped around the bead or tire cores 3.

Above its carcass, the tire body 1, which is provided for the topcapping, has only two superimposed belt plies 4, 5. The outer surface of this partial belt, and the shoulder surfaces 6 of the tire body 1 disposed on both sides of this partial belt, are roughened or otherwise prepared for the further process, after the worn or damaged tire parts that were disposed above these surfaces have been removed. Thereupon, a padding sheet or layer 7 that adheres to steel is placed upon the zenith portion of the tire body 1. By having accelerators and the like mixed therein, the padding layer 7 is prepared in such a way that it can be vulcanized relatively rapidly. The padding layer 7 serves as an underlay or foundation for the newly-to-be-applied belt plies 8 and 9, each of which comprises thin wire strands that are disposed in a layer in a cord ply, and are embedded in rubber, so that two rubberized steel-wire plies result, with the steel wires thereof being angled in opposite directions.

The important thing is that the two belt plies 8, 9 be vulcanized prior to being placed upon the padding layer 7, whereby the rubber that envelops the individual load-carrying cords is no longer plastic, but rather is elastic such that angular changes of the individual load-carrying cords are no longer readily possible.

The two belt plies 8, 9 are then covered or overlaid with a thin binding or connecting sheet or layer 10 of unvulcanized rubber. This rubber layer is also able to vulcanize relatively rapidly. This connecting layer 10, which also serves to compensate for the unevennesses, is now provided with the finish-vulcanized, profiled tread strip 11.

It should be noted that in addition to the sheet-like connecting and padding means 7, 10, coatings and slits can be effected in order to accelerate and improve the bonding between the individual components.

After having been built up in this manner, the tire is now provided with a rubber "bandage", and is additionally placed upon a wheel rim and is inflated prior to being placed in a vulcanizing apparatus which is an autoclave.

As a result of such a processing, the advantageous pressure treatment is completed, and at the same time the temperatures of between 100° and 150° C., respectively between 90° C. and 140° C., that are required for vulcanization are generated. It is not necessarY to provide the tire body, which has been built up in the illustrated manner, with a steel bandage that envelops the tire body in a special way; the load-carrying cords of the belt plies 8 and 9 do not alter their desired angular position because the rubber that envelops them was vulcanized before the two belt plies 8, 9 were placed upon the padding layer 7.

The method of the present invention also has the distinct advantage that the treatment in the vulcanizer can be carried out relatively more rapidly, because the rubber of the two belt plies 8, 9 no longer has to be vulcanized.

As distinguished from prior art involving "biased belted tires", which have a diagonal carcass, the features of the present invention all pertain particularly to radial tires and under these circumstances, differences between diagonal-biased tires and radial tires must be clearly set forth and understood. A designation of "belted tire" without the prefix "bias" encompasses and includes the employment of a radial carcass so that the teaching of the present invention refers particularly to radial tires per se.

The present invention pertains specifically to a method for recapping of radial tires, where at least one of the belt layers is to be replaced.

The only similarity between fabric intermediate layers (breakers or protectors) of diagonal or biased tires and belt layers of radial tires can be considered to be the arrangement thereof between the tread and carcass. While the fabric intermediate layers of diagonal or biased tires solely serve for increasing the puncture safety or security, there is to be noted that the belt layers cooperating in the manner of a triangulate lattice work avoid or overcome deformations in the tread. The angular position of the strength carrier, the material used for the strength carrier, and correspondingly the working or processing characteristics of the layers or plies are completely different between the fabric intermediate layers (breakers, protectors) of biased tires and the stiffening belt plies of radial tires so that the problems encountered with diagonal or biased tires are entirely different from those of radial tires respectively.

While the intermediate layers in the thread of biased tires in essence coincide with the carcass layers or plies (at most a five degree deviation), there is noted that belt layers or plies of belted tires, that are tires with a radial carcass, occupy considerable inclined angles to the radial carcass in a range between 23° and 71°. While intermediate layers or plies consist of textile cord weave or fabric, there is noted that belt layers or plies consist of wire cord thereby being accordingly more stiff by a factor in a range of 3 to 10 already on the basis of the material involved therewith.

While the intermediate layers of diagonal or biased tires serve only as armor plating or protection against penetrating sharp components like fragments of glass and the like, accordingly only having to be capable of providing resistance in essence only in the radial direction, the belt layers or plies must withstand tension or pulling forces in the thread direction thereof. For this reason, the intermediate layers can be cut axially in the diagonal tire manufacture, which facilitates and makes easier the construction and also makes possible the prior bringing together of certain layers or plies, whereas the belt layers can be cut only parallel between the steel cables in radial tire manufacture; the location, where the belt strip is joined into an endless ring, extends approximately over one third of the circumference or periphery thereof.

Already solely because of the restriction in the cut arrangement, there is noted that diagonal or biased tires cannot be applicable for belt layers or plies of radial tires to which the teaching of the present invention is solely applicable.

There is to be noted that considerable push or thrust stresses and tensions between the belt layers or plies are brought about by the extensively non-yielding belt type of construction. The knowledge about high loading at the juncture locations between the belt layers caused all experts or average men skilled in the art up to now to believe that at least one of the binding or bonding partners must be vulcanized before the bringing together thereof.

The push or thrust stress or tension between a diagonal or biased carcass and the fabric or weave protective strip placed thereon is comparatively small in contrast as a consequence of the substantially coinciding angular positioning. This serious difference explains also why previously no one tried the solution being proposed with the present invention disclosure applicable to recapping or retreading of a pneumatic vehicle tire having a radial carcass tire body.

While a complete belt is very stiff and rigid via the triangular connection of the belt layers, there is noted that after removal of one of the belt layers then the remaining belt left on the carcass is very susceptible to deformations. A similar situation could be considered to exist when an upper stone or rock is removed from a configuration of an arc, curvature or arch. Likewise there is noted that the remaining belt during recapping practically cannot be deformed in order not to disturb the low distribution between the belt layers of the recappble tire. The necessary dimensional stability which the remaining belt itself no longer can provide or offer adequately had to be attained up to now via external bandages.

These problems during the recapping of belt layers do not exist with the renewing of woven or fabric intermediate layers on diagonal or biased tires, since here no triangular connections exist therewith. The problems resolved with the teaching of the present invention pertain to radial belted tire carcass bodies and these problems did not arise or become involved for any diagonal tires because these problems did not exist when referring to a belt within the meaning of radial tires known in the present day state of the art.

Because of the higher stiffness, the treads of radial tires must be round within considerably smaller tolerances than the treads of diagonal or biased tires.

A comparison can be made between a so-called rhombus or facet-cut belt configuration and to a so-called triangular belt means. The present inventive disclosure pertains to partial-belt recapping, renewing or retreading in which the tread strip is vulcanized and a pad or cushion plate is unvulcanized as well as having first and second belt layers that are vulcanized located above a further unvulcanized pad or cushion plate with a vulcanizing solution at the bottom, reference being made to a triangular belt means and a so-called "Rauten" belt means referred to as the diamond or rhombus configuration.

In summary, the present invention pertains to a method for retreading and replacing one of the belt layers of a pneumatic vehicle tire with a radial carcass, accompanied by the interposition of binder layer means and the use of gum solvent coating means, including the steps of: vulcanizing a replacement belt layer strip; placing that vulcanized replacement belt layer strip upon a tire body; placing a vulcanized profiled tread strip upon the replacement belt layer strip; and subjecting the compound of the old tire body, overlaid replacement belt layer strip, and tread strip to a vulcanizing oven with an inner temperature in a range of 90° C., to 140° C., an absolute oven pressure of 6-8 bar, a tire surpressure in its inside of 2-4 bar, and a treatment duration of 2 to 5 hours.

Also the method for retreading and replacing several belt layers of a pneumatic tire with a radial carcass, accompanied by the interposition of binder layer means and the use of gum solvent coating means, includes the steps of: vulcanizing replacement belt layer strips, placing the vulcanized replacement belt layer strips upon a tire body one after another; placing a vulcanized profiled tread strip upon the replacement belt layer strips and subjecting the compound of old tire body, overlaid replacement belt layer strip and tread strip to a vulcanizing autoclave with an inner temperature of 90° C.-140° C., an absolute oven pressure of 6-8 bar, a tire surpressure in its inside of 2-4 bar, and a treatment duration of 2 to 5 hours.

The designation "belted tires" without the prefix "bias" necessarily implicates the employment of a radial carcass. An overview about the history of development of features in accordance with the present invention can be provided to facilitate understanding thereof.

Belted tires with a radial carcass were claimed for the first time by the French tire producer Michelin as of June 4, 1946. That tire had at least one dual-layer steel belt upon a radial carcass, whereby the strength carriers in the region of the tread formed so-called "triangular connections".

As documentation for the fact that the designations or concepts "radial tires" and "belted tires" have equal meaning in Europe at least since 1972, there can be attention directed to a publication from a trade magazine "Synthetic Material Technique" of November 1972 with a title "The Cross-Sectional Form of Cross-Layer or CrossPly and Belted Tires" can be found noted with the German concept "belted tires" in English being translated into the wording "radial tires".

In an interesting manner there is to be noted that diagonal tires are still being designated with cross-layer or cross-ply tires; on page 30 of this article, attention is directed to a title of the section 7.4. The radial carcass is expressly mentioned and noted whereas in the first line of the text of this segment or portion there is employed the concept or designation belted tires where the radial carcass is expressly noted or mentioned. In the first line of the text of the segment being used, a completely comparable synonym for a tire with a radial carcass by designating the tire with the wording belted tire. Moreover, in the first line of the text of this segment as a completely synomous terminology for a tire with a radial carcass there is employed the concept of a belted tire.

For differentiation from the cross layers or plies respectively conventional respectively diagonal tires, the concept "belted tire" is employed and in the English translation the concept of "radial-ply tires" can be found to exist. Consequently, the designation "Gürtelreifen" for "belted tire" positively includes and incorporates the employment of a radial carcass per se.

Also, attention can be directed to pages 106 and 107 from a dictionary of ETRTO (May 1980) to the effect that the feature "radial carcass" necessarily is included with the designation "belted tire".

The present invention and patent disclosure under consideration concerns exclusively the round renewal or recapping/retreading of belted tires, accordingly tires which have at least two belt plies or layers upon one radial carcass. The concept or designation "belted tires" as employed in tire-expert language implicates or implies the employment of a radial carcass. If the concern should have involved tires with a diagonal carcass, accordingly there would have been made known expressly the diagonal carcass relationship with the wording "biased". These conceptual definitions are internationally conventional and decided and set forth in "TECHNICAL DICTIONARY" of EUROPEAN TYRE AND RIM TECHNICAL ORGANIZATION (ETRTO). The concepts or designations "radial tires" and "belted tires" are synomous in the tire-expert language.

The wording "radial carcass" must be considered distinguishable from the prior art which involves biased tires vis-a-vis radial carcasses and tires where critical differences stem from the radial tire belt layers "cooperating in the manner of a triangulate lattice work". There should not be taken in any way anything other than a radial carcass tire body involved in the present case so that the terminology "radial carcass" tire body describes specifically the structure involved in the present case and the German designation "Gürtelreifen" for "belted tire" positively and necessarily incorporates therewith the meaning of "radial carcass".

Steel wires in adjacent belt plies are arranged in a crossing relationship such that the steel wires are angled in opposite directions maintained as to angular position. The method for retreading and partially replacing a belt of a pneumatic vehicle tire having a radial carcass tire body, accompanied by the interposition of binder layer means to compensate for unevenness and the use of coating means in such a way that, along with a relatively short vulcanizing and processing time in a vulcanizing apparatus which is an autoclave, a previously required steel-bandage-sleeve can be eliminated, and having an improvement in steps of:

(a) vulcanizing replacement belt ply means including rubberized steel-wire plies in opposite directions and thus kept from shifting prior to placement thereof upon the tire body;

(b) placing the vulcanized replacement belt ply means upon the tire body;

(c) placing a finish-vulcanized, profiled tread strip upon the replacement belt ply means including the rubberized steel-wire plies embedded therein with the steel wires thereof being angled in opposite directions maintained as to angular position; and (d) vulcanizing the tire body and overlaid replacement belt ply means and tread strip in an autoclave at an elevated temperature when the tire, after being built up in this manner, is additionally placed upon a wheel rim and is inflated prior to being placed in the vulcanizing apparatus for the pressure treatment and at the same time temperatures in a predetermined range required for vulcanization, are generated.

The temperatures in a range of between 90° C. and 140° C. required for vulcanization are applicable; also temperatures in a range of between 100° C. and 150° C. required for vulcanization are applicable.

In conclusion, there is noted that a substantial numerical range for the crossing cord angles is involved so as to establish a unique triangulate lattice work in a radial tire having a radial carcass tire body distinguishable from a diagonal biased tire construction.

The present invention is, of course, in no way restricted to the specific disclosure of the specification and drawing, but also encompasses any modifications within the scope of the appended claims.

What we claim is:

1. A method for retreading and partially replacing the belt of a pneumatic vehicle tire having a radial carcass tire body, accompanied by the interposition of binder layer means thereon to compensate for unevenness and the use of coating means in such a way that along with a relatively short vulcanizing and processing time in a vulcanizing apparatus also a previously required steel-bandage-sleeve can be eliminated as to the tire body which is top-capped in a cold state, and having the improvement in combination therewith comprising the steps of:

first vulcanizing replacement belt ply means including rubberized steel-wire plies in opposite directions and thus kept from shifting prior to placement thereof upon the tire body;

placing said vulcanized replacement belt ply means upon the tire body for which at least partial replacing is being undertaken;

placing a vulcanized, profiled tread strip upon said replacement belt ply means including the rubberized steel-wire plies embedded therein with the steel wires thereof being angled in opposite directions maintained as to angular position; and then vulcanizing said tire body and overlaid replacement belt ply means and tread strip in an autoclave at an elevated temperature when the tire, after being built up in this manner, is additionally placed upon a wheel rim and is inflated prior to being placed in the vulcanizing apparatus for the pressure treatment and at the same time, temperatures in a predetermined range required for vulcanization, are generated.

2. A method in combination according to claim 1, in which said vulcanizing step includes initially at least preliminarily stiffening said replacement belt ply means.

3. A method in combination according to claim 1, which includes the steps of: prior to placing said replacement belt ply means upon said tire body, placing a first thin, rapidly vulcanizing, rubber binding and padding layer on said tire body; then placing said replacement belt ply means on said first binding layer; then placing a second thin, rapidly vulcanizing, rubber binding and padding layer on said replacement belt ply means; and then placing said tread strip on said second binding layer.

4. A method according to claim 1, which includes the step of carrying out a pressure treatment at a temperature in a range of between 90° C. to 140° C.

5. A method according to claim 1, which includes the step of carrying out a pressure treatment at a temperature in a range of between 100° C. and 150° C.

6. A method according to claim 1, which includes the steps of carrying out the pressure treatment at a temperature in a range of between 100° C. to 150° C.; and finally vulcanizing with an absolute pressure in the autoclave in a range of between 6 to 8 bar, a tire surpressure in its inside of 2-4 bar, and a treatment duration of 2-5 hours.

7. A method according to claim 1, which includes the steps of carrying out the pressure treatment at a temperature in a range of between 90° C. to 100° C.; and finally vulcanizing with an absolute pressure in the autoclave in a range of between 6 to 8 bar, a tire surpressure in its inside of 2-4 bar, and a treatment duration of 2-5 hours.

8. A method for retreading and replacing one of the belt layers of a pneumatic vehicle tire having a radial carcass tire body, accompanied by the interposition of binder layer means and the use of gum solvent coating means, thereon comprising in combination the steps of:

first vulcanizing a replacement belt layer strip;

placing that vulcanized replacement belt layer strip upon the tire body for which at least partial replacing is being undertaken;

placing a vulcanized profiled tread strip upon said replacement belt layer strip; and finally vulcanizing said tire body, overlaid replacement belt layer strip and tread strip with a temperature in a range of between 90° C., and 140° C., required for vulcanization.

9. A method according to claim 8, which includes with the step of finally vulcanizing with an absolute oven pressure of 6-8 bar, a tire surpressure in the inside of 2-4 bar, and a treatment duration of 2-5 hours.

10. A method for retreading and replacing several belt layers of a pneumatic vehicle tire having a radial carcass tire body for which at least partial replacing is being undertaken, accompanied by the interposition of binder layer means and the use of gum solvent coating means, thereon comprising in combination the steps of:

first vulcanizing replacement belt layer strips;

placing said vulcanized replacement belt layer strips upon the tire body one after another;

placing a vulcanized profiled tread strip upon said replacement belt layer strips; and finally vulcanizing said tire body, overlaid replacement belt layer strip and tread strip with a temperature in a range of between 90° C. and 140° C., required for vulcanization.

11. A method according to claim 10, which includes with the step of finally vulcanizing with an absolute oven pressure of 6-8 bar, a tire surpressure in the inside of 2-4 bar, and a treatment duration of 2-5 hours.

12. A method for retreading and partially replacing the belt of a pneumatic vehicle tire having a radial carcass accompanied by interposition of binder layer means thereon for adhesion and to compensate for unevenness including the steps of:

(a) vulcanizing replacement belt ply means;
(b) placing at least one belt ply means upon the rest of the tire body which should be retreaded;
(c) placing the finish-vulcanized, profiled tread strip upon said belt ply means; and
(d) subjecting said tire body with the replaced, vulcanized belt ply means and finish-vulcanized, profiled tread strip to a pressure treatment in an autoclave.

13. A method according to claim 12, which includes the step of carrying out the pressure treatment at a temperature in a range of between 100° C. to 150° C.

14. A method according to claim 12, which includes the step of carrying out the pressure treatment at a temperature in a range of between 90° C. to 100° C.

15. A method according to claim 12, which includes with the step of finally vulcanizing with an absolute pressure in the autoclave in a range of between 6 to 8 bar, a tire surpressure in its inside of 2-4 bar, and a treatment duration of 2-5 hours.

16. A method according to claim 12, which includes the steps of carrying out the pressure treatment at a temperature in a range of between 100° C. to 150° C.; and finally vulcanizing with an absolute pressure in the autoclave in a range of between 6 8 bar, a tire surpressure in its inside of 2-4 bar, and a treatment duration of 2-5 hours.

17. A method according to claim 12, which includes the steps of carrying out the pressure treatment at a temperature in a range of between 90° C. and 100° C.; and finally vulcanizing with an absolute pressure in the autoclave in a range of between 6 to 8 bar, a tire surpressure in its inside of 2-4 bar, and a treatment duration of 2-5 hours.

* * * * *